Nov. 2, 1948.  O. M. SKIBSTED  2,452,796
SELF-RELEASING ROPE HITCH
Filed Nov. 15, 1945
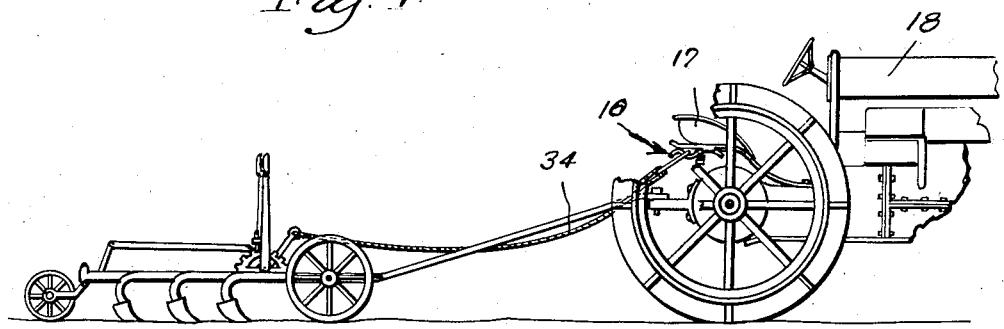
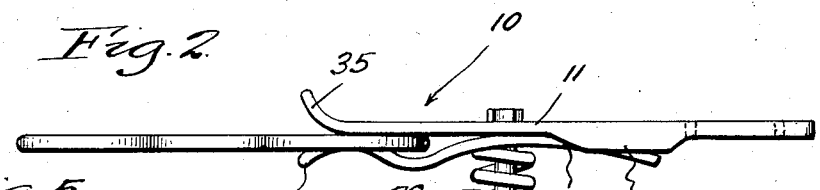
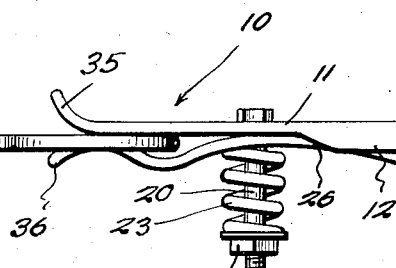
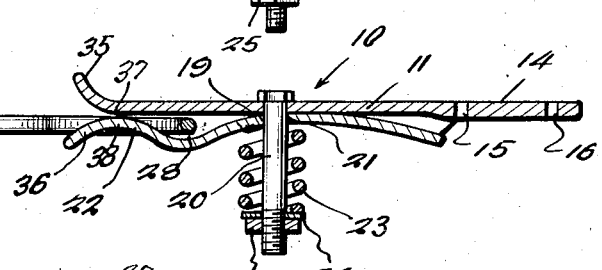
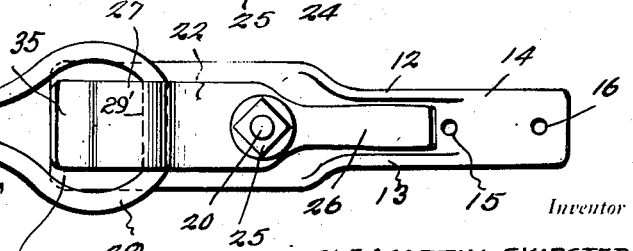
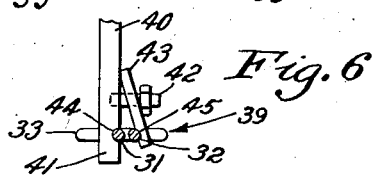
Inventor
OLE MARTIN SKIBSTED
By Clarence A. O'Brien
and Harvey B. Jacobson
Attorneys Patented Nov. 2, 1948

2,452,796

UNITED STATES PATENT OFFICE 2,452,796

SELF-RELEASING ROPE HITCH

Ole Martin Skibsted, Wolford, N. Dak.

Application November 15, 1945, Serial No. 628,750

2 Claims. (Cl. 280—150)

My invention as described herein, and illustrated in the accompanying drawings, consists of a rope hitch, an object of which is to provide means whereby a rope connecting two pieces of farm machinery will automatically release itself from one or the other thereof should the pieces become detached from one another.

Another object of my invention is to provide a spring controlled rope hitch.

A further object of this invention is to provide a spring controlled rope release having an adjustable tensioning device.

Another object of my invention is to provide a double ring connection between a rope and rope hitch.

Other features and advantages will become more readily apparent from the following description and the accompanying illustrative drawings in which:

Figure 1 is a diagrammatic view illustrating one application of my invention,

Figure 2 is an elevation of my hitch,

Figure 3 is a longitudinal sectional view thereof, and

Figure 4 is a plan view of the device.

Figure 5 is an elevational view of a lever handle used for raising the link and for causing the function of the trip rope.

Figure 6 is an elevational view of the assembled portions of lever handle and link as noted for Figure 5.

In the accompanying drawings, and in the following specification, the same reference characters are used to designate the same parts and elements throughout and in which 10, refers to my invention in its entirety and 11, indicates a rigid metal strap provided with intermediate side wings 12 and 13, a reduced rear end 14, with apertures 15 and 16, whereby the device may be bolted to the seat 17, of a tractor 18.

Projecting through a bore 19, in the plate 11, intermediate of its ends is a bolt 20, which also projects through an aligning bore 21, in a jaw member 22, held against the plate 11, by means of a tensioning spring 23, coiled upon the bolt and secured thereto by a washer 24, seated upon the tensioning nut 25, on the threaded end of the bolt.

The member 22, is provided with an inner arcuate rocker end 26, which is reduced in width and seats operatively between said wings whereby member 22, is held in true alignment with plate 11, and against pivotal movement upon the bolt 20. The forward end 27, of member 22, is provided with a transverse groove 28, adapted to receive the enlarged ring end 29, of a link 30, intermediately having its sides 31 and 32, pressed in forming the ring 29, and an outer reduced ring 33, to which a trip rope 34, is attached. The outer terminals of both members 11 and 22, are turned away from one another to provide lips 35 and 36, to permit the ring 29, to be pushed in between the normally contacting bite portions 37 and 38, of said members 11 and 22.

Referring to Figure 5 of the drawings 40 is a lever handle, the lower end of which forms a jaw 41, to which is connected by a bolt 42, another jaw 43, both having slight parallel grooves 44 and 45, transversely of the jaws and which are adapted to grip the intermediate portions 31 and 32, whereby the lever will be held in fixed vertical position upon said link 30, whereby the crank end 46, when pulled down will raise the link and cause the functioning of the trip rope 34. In this case the straight inner end 29', of ring 29, will act as a hinge.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention, that which I claim as new and desire to procure by Letters Patent is:

1. For use in tractor and implement assemblies, a hitch comprising a pair of plates rockingly engaging each other substantially medially, a pivot pin extending through said plates at substantially the medial points thereof, spring means on said pin for resiliently biasing said plates toward each other, jaw members at one pair of ends of said plates, cam surfaces on the opposite pair of plate ends rockingly engaging each other, longitudinal guide rails on a predetermined plate receiving the other plate therebetween.

2. A tractor hitch comprising a flat plate having an arcuate end portion, guide rails on said flat plate, a curved plate having an arcuate end portion cooperating with said first mentioned end portion, a bight in said curved plate cooperating with said flat plate to form a latch, a curvilinear section on said curved plate engageable with said flat plate between said guide rails, a pivot pin extending through said flat plate and the curved plate at substantially the inception of said curvilinear section, spring means on said pin for biasing said plates toward each other.

OLE MARTIN SKIBSTED.

REFERENCES CITED

The following references are of record in the file of this patent:

UNITED STATES PATENTS

| Number | Name | Date |
|---|---|---|
| 1,682,994 | Simon | Sept. 4, 1928 |
| 2,370,232 | Creekbaum | Feb. 27, 1945 |